United States Patent [19]
Teshima

[11] Patent Number: 6,072,660
[45] Date of Patent: *Jun. 6, 2000

[54] DISK DRIVING APPARATUS USING DYNAMIC PRESSURE-TYPE BEARING DEVICE

[75] Inventor: Hiroyoshi Teshima, Tottori-ken, Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,688

[22] Filed: Jul. 26, 1996

[30] Foreign Application Priority Data

Jul. 28, 1995  [JP]  Japan ..................................... 7-193046

[51] Int. Cl.[7] ............................. G11B 17/02; F16C 17/10
[52] U.S. Cl. .................................... 360/99.08; 360/98.07; 360/98.04; 384/113; 384/292; 384/909
[58] Field of Search .............................. 360/98.07, 99.04, 360/99.08; 384/100, 107, 112, 113, 114, 115, 120, 121; 310/90, 67 R

[56] References Cited

U.S. PATENT DOCUMENTS

| | | | |
|---|---|---|---|
| 4,573,807 | 3/1986 | Asada et al. ............................ | 384/100 |
| 4,873,282 | 10/1989 | Yui et al. ................................. | 524/496 |
| 4,877,813 | 10/1989 | Jinno et al. .............................. | 525/146 |
| 5,096,309 | 3/1992 | Nakasugi et al. ....................... | 384/112 |
| 5,141,338 | 8/1992 | Asada et al. ............................. | 384/114 |
| 5,466,070 | 11/1995 | Nakasugi ................................. | 384/112 |
| 5,509,738 | 4/1996 | Haynes et al. ........................... | 384/275 |
| 5,664,890 | 9/1997 | Nowak et al. ........................... | 384/282 |
| 5,866,647 | 2/1999 | Massey et al. .......................... | 524/494 |

FOREIGN PATENT DOCUMENTS

| | | |
|---|---|---|
| 60-234120 | 11/1985 | Japan . |
| 63-9717 | 1/1988 | Japan . |
| 63-33022 | 3/1988 | Japan . |
| 3-92616 | 4/1991 | Japan . |
| 3-181612 | 8/1991 | Japan . |
| 4-175510 | 6/1992 | Japan . |
| 4-258522 | 9/1992 | Japan . |
| 5-242649 | 9/1993 | Japan . |
| 5-347066 | 12/1993 | Japan . |

*Primary Examiner*—William Klimowicz
*Attorney, Agent, or Firm*—Wenderoth, Lind & Ponack, L.L.P.

[57] ABSTRACT

A disk driving apparatus using a dynamic pressure-type bearing device of an oil lubrication type, wherein the bearing device includes a housing main body, a sleeve part fixed to the housing main body, a rotor part relatively rotatable to the housing main body, a shaft having a spherical front end clamped to the rotor part, a bottom plate at an end face of the shaft and a thrust member interposed between the shaft and the bottom plate has a dynamic pressure radial bearing constructed by the shaft and the sleeve part and having herringbone grooves formed at either of the shaft and sleeve part, the thrust member being formed of a high polymer, and a thrust pivot bearing constructed by the thrust member set at the bottom plate secured to one side of the sleeve part and one end of the shaft.

14 Claims, 5 Drawing Sheets

DISK DRIVING APPARATUS USING DYNAMIC PRESSURE-TYPE BEARING DEVICE

BACKGROUND OF THE INVENTION

The present invention relates to a disk driving apparatus using a dynamic pressure-type bearing device to be used in an optical disk driving apparatus and a magnetic disk driving apparatus, etc.

Recent optical and magnetic disk driving apparatuses show a tendency towards a compact and light-weight structure with an increased capacity. Spindle motors driving these apparatuses similarly will inevitably be required to be small and thin, and moreover highly accurate, as notebook-size personal computers become wide spread. Also, an improvement in shock resistances is needed. Although ball bearings have been often employed as bearings for spindle motors, small ball bearings adopted to cope with the reduction of an outer diameter of the spindle motor are insufficient to achieve a sufficient rotation accuracy, impeding the fulfillment of the above requirement for a larger capacity and extraordinarily deteriorating shock resistances to generate noises.

Because a large capacity cannot be attained with the rotation accuracy of ball bearings, a dynamic pressure-type fluid bearing spindle motor having a lubricating oil filled therein has started to be put in use, wherein a bearing in a thrust direction is made a pivot bearing.

FIG. 8 shows an example of such a kind of rotary driving apparatus as referred to hereinabove.

A conventional magnetic disk driving apparatus will now be described below with reference to FIG. 8.

FIG. 8 is a sectional view of a conventional magneto-optic disk driving apparatus using a dynamic pressure bearing in a state engaged with a magneto-optic disk.

In FIG. 8, the reference numerals are: 201, a magneto-optic disk; 202, a disk hub; 203, a shaft; 204, a sleeve part; 205, a thrust plate; 206, a chucking magnet; 207, a shaft clamping part; 208, a rotor hub part; 209, a rotor frame; 210, a magnet; 211, a stator core; 212, a coil; 213, a printed circuit board; 214, a housing; 215, a first radial dynamic pressure bearing part; and 216, a second radial dynamic pressure bearing part, respectively.

The rotor hub part 208 loading and positioning the magneto-optic disk 201 is clamped by the clamping part 207 to the shaft 203, which is engaged with the magneto-optic disk 201 while positioning a rotational center of the disk 201 and is rotated at a predetermined revolution number together with the magneto-optic disk 201. The disk hub 202, formed of a soft magnetic material at the central part of the magneto-optic disk 201, is magnetically attracted and secured to the rotor hub part 208 by the chucking magnet 206. The chucking magnet 206 is fixed to the rotor hub part 208. Also, the rotor frame 209, generally in the shape of a cup for forming a magnetic path of the hollow cylindrical field magnet 210 having many magnetized poles, is secured to the rotor hub part 208. The shaft 203 is pressed into the central part of the rotor frame 209, the magnet 210 is bonded at an inner peripheral part of the rotor frame 209, and the rotor hub part 208 supporting the disk 201 and the chucking magnet 206 are caulked at the top ceiling part of the rotor frame, respectively, thereby constituting a rotor part as a whole. The fixing of the shaft 203, magnet 210, and rotor hub part 208, as well as the chucking magnet 106, to the rotor frame 209 may be done In different ways than the above.

Outside an internal cylindrical part of the housing 214 is rigidly set the stator core 211 having the coil 212 wound therearound. The printed circuit board 213 having elements such as ICs, or a printed circuit pattern formed to drive the motor, is fixed to the housing 214. The sleeve part 204 is secured inside the cylindrical part of the housing 214, to which sleeve part 204 the thrust plate 205 is secured.

The above-constructed rotor part is supported by the sleeve part 204 in a radial direction and by the thrust plate 205 in a thrust direction so as to be freely rotatable.

The shaft 203 is rotatably inserted into a hole of the sleeve part 204 which includes the first and second bearing parts 215, 216 with herringbone grooves. The rotor part is fixed at one end of the shaft 203. The other end of the shaft 203 and the thrust plate 205 set at an end of the sleeve part 204 constitute a thrust pivot bearing for supporting the shaft 203 in the thrust direction.

The dynamic pressure-type bearing device constituted as above operates in the following manner.

When the shaft 203 is rotated, a dynamic pressure is generated in the radial direction via an oil owing to the herringbone grooves formed in the bearing parts 215, 216 of the sleeve part 204, thus letting the shaft 203 float and rotate in a non-contact manner. Since the front end of the shaft 203 and the metallic thrust plate 205 constitute the pivot bearing in the thrust direction, the shaft 203 is not floated in the thrust direction, so that the height of a disk surface is not changed between the stationary state and the rotating state.

Although the oil used in the fluid bearing is an insulating oil, the magnetic disk is connected and turned conductive to a chassis of the device because the front end of the shaft 203 and the thrust plate 205 are formed of metal. It can be prevented that the magnetic disc is electrostatically charged during the rotation of the magnetic disk as a result of the friction thereof with the air, and thus a potential difference is generated between the magnetic disk and a magnetic head.

If the sleeve part 204 and the thrust plate 205 are tightly secured by a caulking or the like into a sealed state, the oil is lubricated to the sleeve part 204 secured to the thrust plate 205 thereby to insert the shaft 203 to a set position. However, the thus-sealed state of the thrust part consumes time for the insertion of the shaft 203.

In the prior art arrangement as above, if the shaft 203 is rotary, the dynamic pressure is generated in the radial direction via the oil owing to the action of the herringbone grooves formed in the bearing parts of the sleeve part 204 when the shaft 203 is rotated, floating and rotating the shaft 203 in a non-contact manner. Thus, high reliability is secured. Also in the case where the shaft is of a fixed type, similarly, high reliability is ensured if a dynamic pressure bearing is constituted in the radial direction to thereby rotate the shaft in a non-contact fashion. Since the front end of the shaft 203 and the metallic thrust plate 205 constitute the pivot bearing in the thrust direction, the shaft 203 is not floated in the thrust direction, therefore not changing the height of the disk surface when the rotation of the disk is stopped and when the disk is rotated. However, the sliding motion between the front end of the shaft 203 and the thrust plate 205 brings about abrasion. Specifically, metallic abrasion particles of the thrust plate 205 abraded by the front end of the shaft 203 invade the pivot bearing, accelerating the abrasion. The oil in the dynamic pressure-type bearing device is contaminated, and moreover, the reliability is considerably deteriorated.

If the sleeve part 204 and the thrust plate 205 are securely caulked into a sealed state, the oil is lubricated to the sleeve part 204 fixed to the thrust plate 205 to insert the shaft 203. At this time, the air is sealed inside the sleeve part 204, and an insertion speed for the shaft 203 is consequently related to the amount of the air passing through a gap between the shaft 203 and the sleeve part 204. As such, if the fluid bearing has a narrow gap between them, it inconveniently takes much time to insert the shaft 203 to a set position.

SUMMARY OF THE INVENTION

The object of the present invention is therefore to provide a disk driving apparatus using a dynamic pressure-type bearing device capable of preventing the generation of metallic abrasion particles of a thrust plate and a shaft.

In accomplishing these and other objects, according to a first aspect of the present invention, there is provided a disk driving apparatus using a dynamic pressure-type bearing device of an oil lubrication type. The bearing device comprises a housing main body, a sleeve part fixed to the housing main body, a rotor part relatively rotatable to the housing main body, a shaft having a spherical front end clamped to the rotor part, a bottom plate at an end face of the shaft, and a thrust member interposed between the shaft and the bottom plate. A dynamic pressure radial bearing is constructed by the shaft and the sleeve part, having herringbone grooves formed at either of the shaft and sleeve part, and the thrust member is formed of a high polymer. A thrust pivot bearing constructed by the thrust member is set at the bottom plate secured to one side of the sleeve part and one end of the shaft.

According to a second aspect of the present invention, there is provided a disk driving apparatus using a dynamic pressure-type bearing device of an oil lubrication type. The bearing device comprises a housing main body, a rotor part relatively rotatable to the housing main body, a sleeve part fixed to the rotor part, a shaft having a spherical front end clamped and secured to the housing main body, and an upper plate at an end face of the shaft. A thrust member interposed between the shaft and upper plate. A dynamic pressure radial bearing is constructed by the shaft and the sleeve part with herringbone grooves formed at either of the shaft and the sleeve part. The thrust member is formed of a high polymer. A thrust pivot bearing is constructed by the thrust member set at the upper plate and is secured to one side of the sleeve part and one end of the shaft.

According to a third aspect of the present invention, there is provided the disk driving apparatus using a dynamic pressure-type bearing device according to the first or second aspect, wherein a conductive material is contained in the high polymer of the thrust member of the thrust pivot bearing.

According to a fourth aspect of the present invention, there is provided the disk driving apparatus using a dynamic pressure-type bearing device according to the first or second aspect, wherein the high polymer of the thrust member is a polyacetal resin.

According to a fifth aspect of the present invention, there is provided the disk driving apparatus using a dynamic pressure-type bearing device according to the first or second aspect, wherein the high polymer of the thrust member is a polyimide resin.

According to a sixth aspect of the present invention, there is provided the disk driving apparatus using a dynamic pressure-type bearing device according to the first or second aspect, wherein the thrust pivot bearing holds the relationship of the expression:

$$\{10d > r > 1.5*(d/2)\}$$

wherein r is a radius of curvature of an R-form of the front end of the shaft constituting the pivot bearing together with the high polymer of the thrust member, and d is a diameter of the shaft.

According to a seventh aspect of the present invention, there is provided the disk driving apparatus using a dynamic pressure-type bearing device according to the first or second aspect, wherein an inner diameter of the sleeve part is made large so that an intersecting outline part of an R-form of the front end of the shaft constituting the pivot bearing together with the high polymer of the thrust member and an outer peripheral part of the shaft does not overlap a part where the herringbone groove is formed.

According to an eighth aspect of the present invention, there is provided the disk driving apparatus using a dynamic pressure-type bearing device according to the seventh aspect, wherein a radius of curvature r of the R form of the front end of the shaft constituting the pivot bearing together with the high polymer of the thrust member satisfies the relationship of the relationship of the expression:

$$\Delta g > x$$

wherein x is a distance between the intersecting outline part and the part where the herringbone groove is formed, and Δg is a gap between a cylindrical part of the sleeve part of the thrust bearing part and the shaft.

According to a ninth aspect of the present invention, there is provided the disk driving apparatus using a dynamic pressure-type bearing device according to the first or second aspect, where the thrust pivot bearing holds a relationship: D>d wherein d is a diameter of the shaft constituting the pivot bearing together with the high polymer thrust member and D is a diameter of the thrust member.

According to a tenth aspect of the present invention, there is provided the disk driving apparatus using a dynamic pressure-type bearing device according to the first or second aspect, wherein the bottom plate has a notch formed in its outer periphery.

According to an eleventh aspect of the present invention, there is provided the disk driving apparatus using a dynamic pressure-type bearing device according to the first or second aspect, wherein a hole is formed communicating from a surface of the sleeve part where the bottom plate is clamped to an outer periphery of the sleeve part, and a groove is formed in the sleeve part to connect the hole with the pivot bearing, to thereby secure communication between the pivot bearing and the outer periphery of the sleeve part.

According to a twelfth aspect of the present invention, there is provided a disk driving apparatus using a dynamic pressure-type bearing device of an oil lubrication type. The bearing device comprises a housing main body, a sleeve part fixed to the housing main body, a rotor part that is relatively rotatable with respect to the housing main body, a shaft having a spherical front end clamped to the rotor part, and a bottom plate at an end face of the shaft. A thrust member is interposed between the shaft and the bottom plate. A dynamic pressure radial bearing is constructed by the shaft and the sleeve part with herringbone grooves formed at either of the shaft and sleeve part. A thrust pivot bearing is constructed by the thrust member set at the bottom plate secured to one side of the sleeve part and one end of the shaft. A notch is formed in an outer periphery of the bottom plate.

According to a thirteenth aspect of the present invention, there is provided a disk driving apparatus using a dynamic pressure-type bearing device of an oil lubrication type. The bearing device fixed to the housing main body, a sleeve part fixed to the housing main body, a rotor part that is relatively rotatable with respect to the housing main body, a shaft having a spherical front end clamped to the rotor part, and a bottom plate at an end face of the shaft and a thrust member is interposed between the shaft and the bottom plate. A dynamic pressure radial bearing is constructed by the shaft and the sleeve part and has herringbone grooves formed at either of the shaft and sleeve part. A thrust pivot bearing is constructed by the thrust member set at the bottom plate secured to one side of the sleeve part and one end of the shaft. A hole is formed communicating from a surface of the sleeve part where the bottom plate is clamped to an outer periphery of the sleeve part, and a groove is formed in the sleeve part to connect the hole with the pivot bearing, to thereby secure communication between the pivot bearing and the outer periphery of the sleeve part.

According to a fourteenth aspect of the present invention, there is provided a disk driving apparatus using a dynamic pressure-type bearing device according to the eleventh or twelfth aspect, wherein the thrust member is formed of a high polymer.

In the above-described constitution, there is employed the pivot bearing in the thrust direction with the resin thrust member interposed between the front end of the shaft and the metallic thrust plate. Since the abrasion is given rise to through the friction of the front end of the shaft and the thrust plate without forming metallic abrasion particles, the abrasion is prevented from being promoted by the invasion of abrasion particles in the pivot bearing. When the thrust member is formed of a material having superior sliding properties or heat resistance, the reliability can be furthermore improved.

When the thrust member has conduction properties, the front end of the shaft can be brought into a conductive state with a chassis of the apparatus via the thrust member.

In the case where the sleeve part and the metallic plate are secured to each other by caulking or the like, when the oil is lubricated to the sleeve part fixed to the thrust plate so as to insert the shaft therein, the air runs through a hole and a gap or groove communicating with the outside of the sleeve part into the sleeve part, so that the shaft can be inserted easily to a set position.

BRIEF DESCRIPTION OF THE DRAWINGS

The above other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
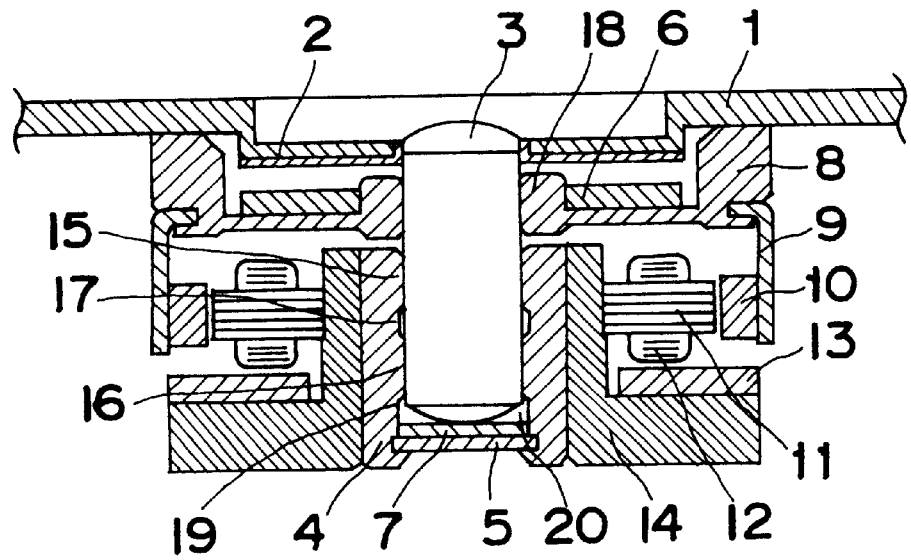
FIG. 1 is a sectional view of a magneto-optic disk driving apparatus using a dynamic pressure bearing in a state fitted with a magneto-optic disk in a first embodiment of the present invention.

Before the description of the present invention proceeds, it is to be noted that like parts are designated by like reference numerals throughout the accompanying drawings.

A first embodiment of the present invention will be described with reference to the drawings.

Figure 2:
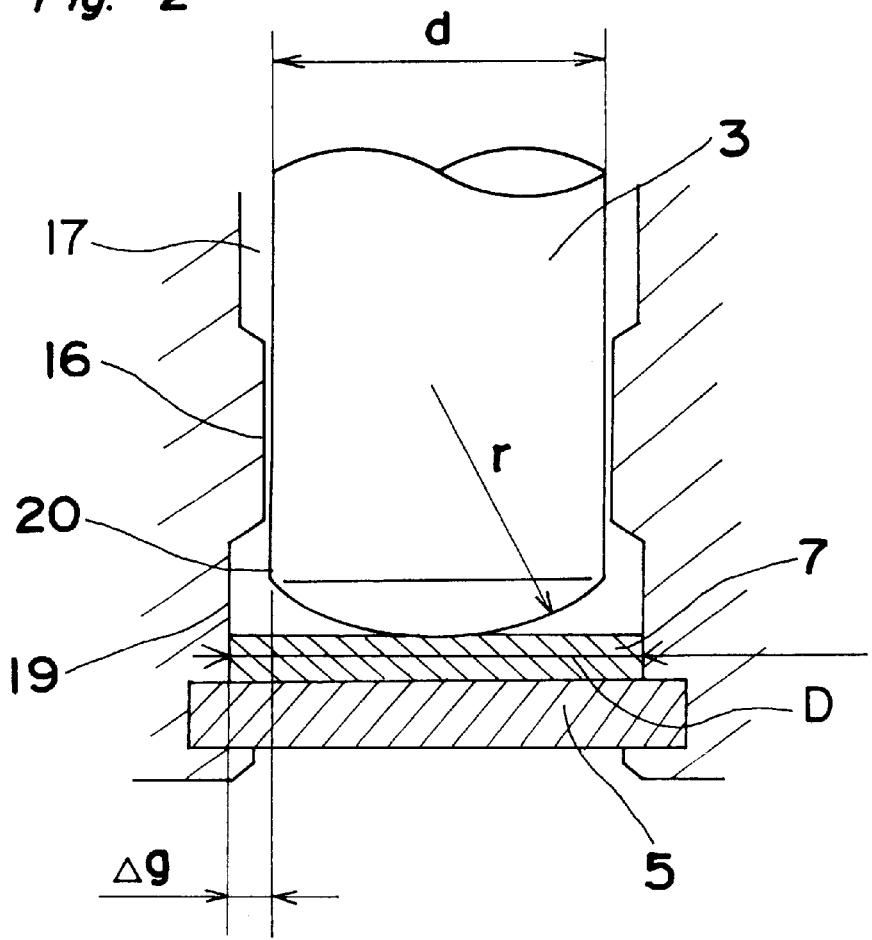
FIG. 2 is an enlarged view explanatory of a pivot bearing part of the magneto-optic disk driving apparatus in the first embodiment of the present invention.

FIG. 1 is a sectional view of a magneto-optic disk driving apparatus using a dynamic pressure bearing in a state engaged with a magneto-optic disk according to a first embodiment of the present invention. FIG. 2 is an enlarged view explanatory of a pivot bearing part in the first embodiment of the present invention.

In FIGS. 1 and 2, reference numeral 1 indicates a magneto-optic disk, likewise, 2 a disk hub, 3 a shaft, 4 a sleeve part, 5 a bottom plate, 6 a chucking magnet, 7 a thrust member, 8 a rotor hub part, 9 a rotor frame, 10 a magnet, 11 a stator core, 12 a coil, 13 a printed board, 14 a housing, 15 a first cylindrical part of the sleeve part 4, 16 a second cylindrical part of the sleeve part 4, 17 a space part, 18 a clamping part of the rotor hub part 8 clamping to the shaft 3, 19 a third cylindrical part of the sleeve part 4, and 20 an intersecting outline part of a front R-form and an outer peripheral part of the shaft 3.

The shaft 3 is engaged with the magneto-optic disk 1 while positioning a rotational center of the magneto-optic disk 1. The shaft 3 is rotated together with the magneto-optic disk 1 at a predetermined revolution number. The rotor hub part 8 of the rotor which positions the magneto-optic disk 1 loaded thereon in the heightwise direction is clamped with the shaft 3 at the clamping part 18. The disk hub 2 formed of a soft magnetic material at the central part of the magneto-optic disk 1 is magnetically attracted by the chucking magnet 6 fixed to the rotor hub part 8 of the rotor, so that the disk hub 2 is secured to the rotor hub part 8. Moreover, the rotor frame 9, generally in the shape of a cup, is fixed to the rotor hub part 8. The hollow cylindrical magnet 10, having many magnetized poles, forms a magnetic path in the rotor frame 9. The shaft 3, the magnet 10, and the rotor hub part 8 supporting both the disk and the chucking magnet 6 are pressed in the central part of the rotor frame 9, bonded at an inner peripheral part of the rotor frame 9, and caulked at the top part of the rotor frame 9, respectively.

The stator core 11 having the coil 12 wound therearound is rigidly secured outside an inner cylindrical part of the housing 14. The printed board 13 on which elements such as Ics or a printed circuit board for driving the motor are mounted is fixed to the housing 14. The sleeve part 4 is secured inside the cylindrical part of the housing 14, to which the bottom plate 5 is fixed. The front end of the shaft 3 is supported via the thrust member 7 in the thrust direction by the bottom plate 5 and slides on the thrust member 7. A pivot bearing is hence formed.

The shaft 3 is rotatably inserted into a hole of the sleeve part 4 which has the first and second cylindrical parts 15, 16. Herringbone grooves are formed at the inner surfaces of the cylindrical parts 15, 16. The rotor hub is secured to one end of the shaft 3.

The space part 17 of a larger inner diameter than the inner diameters of the first and second cylindrical parts 15 and 16 is formed between the first and second cylindrical parts 15 and 16. Moreover, the third cylindrical part 19, of a larger diameter than that of the cylindrical parts 15, 16, is arranged at a thrust bearing part-side of the sleeve part 4.

The operation of the dynamic pressure-type bearing device of the above structure will be depicted hereinbelow with reference to the drawings.

When the shaft 3 is rotated, a dynamic pressure is generated via an oil owing to the action of the herringbone grooves formed in the cylindrical parts 15, 16 of the sleeve part 4, so that the shaft 3 is floated and rotated in a non-contact fashion. The sleeve part 4 and the bottom plate 5 shut the shaft 3 in the thrust direction. The thrust member 7 of a high polymer is interposed between the bottom plate 5 and the front end of the shaft 3. The shaft 3 accordingly slides on the thrust member 7. The thrust member 7 is abraded after driving for a long time. Part of resulting abrasion particles reach the intersecting outline part 20 along the front R-part of the shaft 3 in some cases. Since the intersecting outline part 20 does not cover the second cylindrical part 16, but the third cylindrical part 19 is located there, the abrasion particles are prevented from entering the bearing part of the herringbone grooves, whereby the life of the motor is secured. From this, the intersecting outline part 20 of the pivot shaft is so designed as not to cover the radial bearing in the dynamic pressure-type fluid bearing device having the pivot bearing.

Supposing that a distance from the intersecting outline part 20 to the second cylindrical part 16 of the radial bearing which is closest to the intersecting outline part 20 of the pivot shaft is x, and a gap between the shaft 3 and an inner diametrical part of the third cylindrical part 19 is $\Delta g$, a relationship represented in Expression (4) is maintained.

$$\Delta g > x \quad (4)$$

As a result of this relationship, abrasion particles generated from the thrust bearing are prevented from entering the radial bearing of the narrow gap.

Further, supposing that a radius of the front R- part of the shaft 3 is r, a maximum surface pressure Pmax and a friction torque Tp are obtained as follows.

$$\left. \begin{array}{l} P\max = a^* r^{(-2/3)} \\ Tp = b^* r^{(1/3)} \end{array} \right\} \quad (5)$$

wherein a and b are coefficients.

Figure 3:
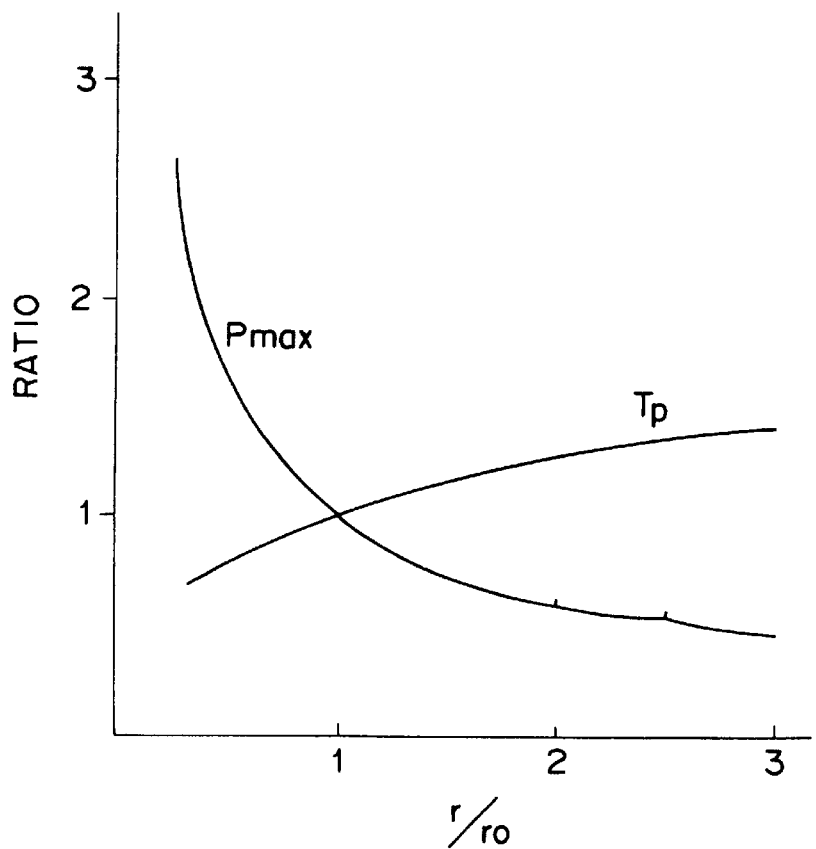
FIG. 3 is a graph of a relationship of a maximum surface pressure and a friction torque to a radius.

When the radius is set to be $r_o$, it is supposed that the maximum surface pressure Pmax and the friction torque Tp are 1. The relationship between ($r/r_o$), and the maximum surface pressure and the friction torque is shown in FIG. 3. When the radius r of the front end of the shaft 3 is decreased, the friction torque is lowered, whereas the surface pressure is increased. Therefore, an excessive surface pressure rather deteriorates the reliability of the apparatus in some cases if the thrust member 7 is formed of a resin. When the radius r is increased, the surface pressure is reduced, but the friction torque is increased. In this case, the torque loss may be turned to heat and raise the temperature, thereby damaging the reliability. To solve this issue, the pivot bearing is designed so that the radius r of the front end of the shaft 3 and a diameter d of the shaft 3 satisfies the relationship of an Expression (3), i.e., 10d>r>1.5*d/2.

The thrust member 7 is formed of a general high polymer. However, when the present apparatus is to be used as a portable apparatus, a polyacetal resin showing superior lubricity is selected to reduce the long-term friction torque. On the other hand, if the apparatus is often used at a high temperature, a polyimide resin of superior heat resistance is selected.

When an outer diameter D of the thrust member 7 and the diameter d of the shaft 3 are set to hold D>d, the thrust member 7 never slips out from the sleeve part 4 when the shaft 3 is to be inserted, thereby stabilizing the insertion operation. Although the thrust member 7, tightly adhered to the bottom plate 5, is not moved owing to the oil, even when the shaft 3 is moved in the thrust direction, it may happen that the thrust member 7 is moved in a plane direction, resulting in the necessity of regulating the motion. Therefore, the relationship D>d should be maintained so as to increase the contact area to make the motion difficult, thereby controlling and regulating the movement of the thrust member 7, in addition, with the inner surface of the third cylindrical part 19. A bearing satisfying the relationship D>d is constructed by assembling the thrust member 7 to the sleeve part 4 before the bottom plate 5 is fitted.

A magnetic disk driving apparatus using a dynamic pressure bearing according to a second embodiment of the present invention will now be described below.

Figure 4:
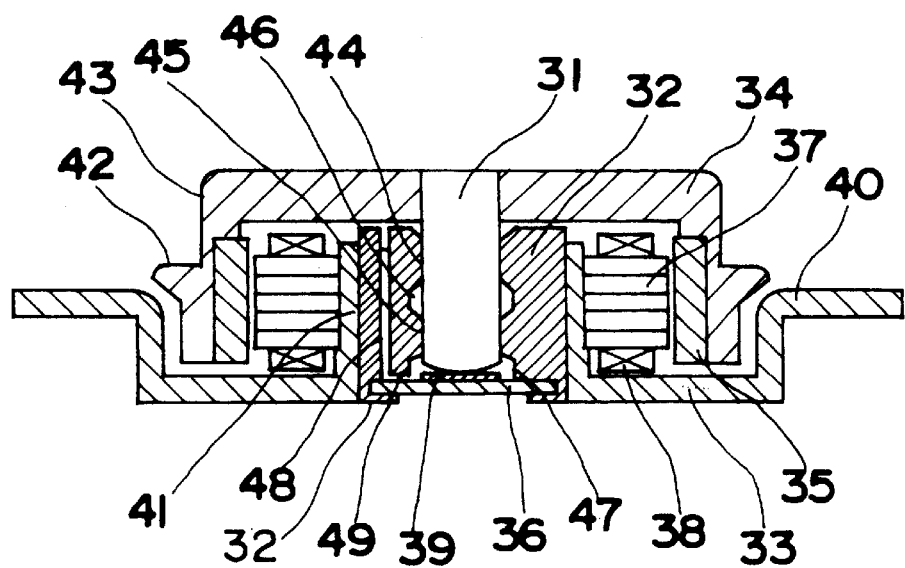
FIG. 4 is a sectional view of a magnetic disk driving apparatus using a dynamic pressure bearing in a second embodiment of the present invention.

FIG. 4 is a sectional view of a magnetic disk driving apparatus in a second embodiment.

In FIG. 4, reference numeral 31 denotes a shaft, 32 a sleeve part, 33 a housing, 34 a rotor hub part, 35 a magnet, 36 a bottom plate, 37 a stator core, 38 a coil, 39 a thrust member, 40 a flange part of the housing 33, 41 an inner cylindrical part of the housing 33, 42 a disk receiver face, 43 a cylindrical regulating part regulating an inner diameter of a disk, 44 a first cylindrical part of the sleeve part 32, 45 a second cylindrical part of the sleeve part 32, 46 a space part, 47 a third cylindrical part of the sleeve part 32, 48 a hole, and 49 a communicating part of the third cylindrical part 47 communicating with the hole 48.

The flange part 40, inner cylindrical part 41, and outer cylindrical part are accommodated in the housing 33 of the motor. The outer periphery of the flange part 40 of the housing 33 is set to a chassis of the HDD (hard disk drive) apparatus. The sleeve part 32 is set inside the inner cylindrical part 41. The stator core 37 having the coil 38 wound therearound is secured to the outer peripheral surface of the inner cylindrical part 41 of the housing 33. The rotor hub part 34 forms a cup-like shape comprising the disk receiver face 42 and the cylindrical regulating part 43. The cylindrical magnet 35 is secured at the inner periphery of a cylindrical part of the rotor hub part 34 while N and S poles are alternately magnetized in a circumferential direction of the magnet 35. The shaft 31 is secured at the central part of the rotor hub part 34, and the magnet 35 is fixed at an inner peripheral part of the rotor hub part 34, thereby forming a rotor part as a whole.

The shaft 31 is inserted in a rotatable manner into a hole of the sleeve part 32. The first and second cylindrical parts 44, 45 of the sleeve part 32 have herringbone grooves formed at the inner surfaces thereof. One end of the shaft 31 is formed in an R shape. The thrust member 39 of a high polymer interposed between the bottom plate 36 and the front end of the shaft 31 constitutes a pivot bearing along with the front end of the shaft 31.

The space part 46 of a larger diameter than the inner diameters of the first and second cylindrical parts 44 and 45 is provided between the first and second cylindrical parts 44 and 45. The third cylindrical part 47 of a larger diameter than that of the cylindrical parts 44, 45 is set at a thrust bearing-side of the sleeve part 32. An oil is present in a minute gap between the first, second cylindrical parts 44, 45 and the shaft 31.

The small hole 48 is open and penetrates the sleeve part 32, and communicates with the third cylindrical part 47 via the communicating part 49.

The operation of the dynamic pressure-type bearing device of the aforementioned structure will be described with reference to the drawings.

A magnetic disk (not shown) is loaded on the disk receiver rotor hub part the rotor hub part 34. The motor including the above-described rotor part and the housing 33 is a brushless radial motor. When a current is supplied to the coil 38, a magnetic field is formed at the projecting poles of the stator core 37 and consequently a torque is generated between the stator core 37 and the field magnet 35 opposed to the stator core 37, whereby the rotor part is rotated. As a result, the magnetic disk clamped to the rotor hub part 34 is rotated along with the rotation of the rotor part.

When the shaft 31 is rotated, a dynamic pressure is brought about via an oil owing to the operation of herringbone grooves formed in the cylindrical parts 44, 45 of the sleeve part 32. The shaft 31 is floated and rotated in a non-contact manner. The front end of the shaft 31 slides on the thrust member 39 in the thrust direction.

The thrust member 39 may be formed of a conductive high polymer. Therefore, the front end of the shaft 31 is electrically connected with the thrust member 39; in other words, the magnetic disk is electrically connected to the chassis of the apparatus. It can be prevented that during the rotation of the magnetic disk, the magnetic disk is charged with static electricity because of the friction against the air and therefore a potential difference is brought about between the magnetic disk and a magnetic head.

If the sleeve part 32 and the bottom plate 36 are tightly sealed by caulking or the like, the air in the sleeve part 32 comes out through the communicating part 49 and the hole 48 when the oil is lubricated into the sleeve part 32, fixed to the bottom plate 36, to insert the shaft 31. Therefore, the shaft 31 can be easily inserted to a set position even if the fluid bearing has a narrow gap.

A third embodiment of the present invention will be depicted hereinbelow with reference to the drawings.

Figure 5A:
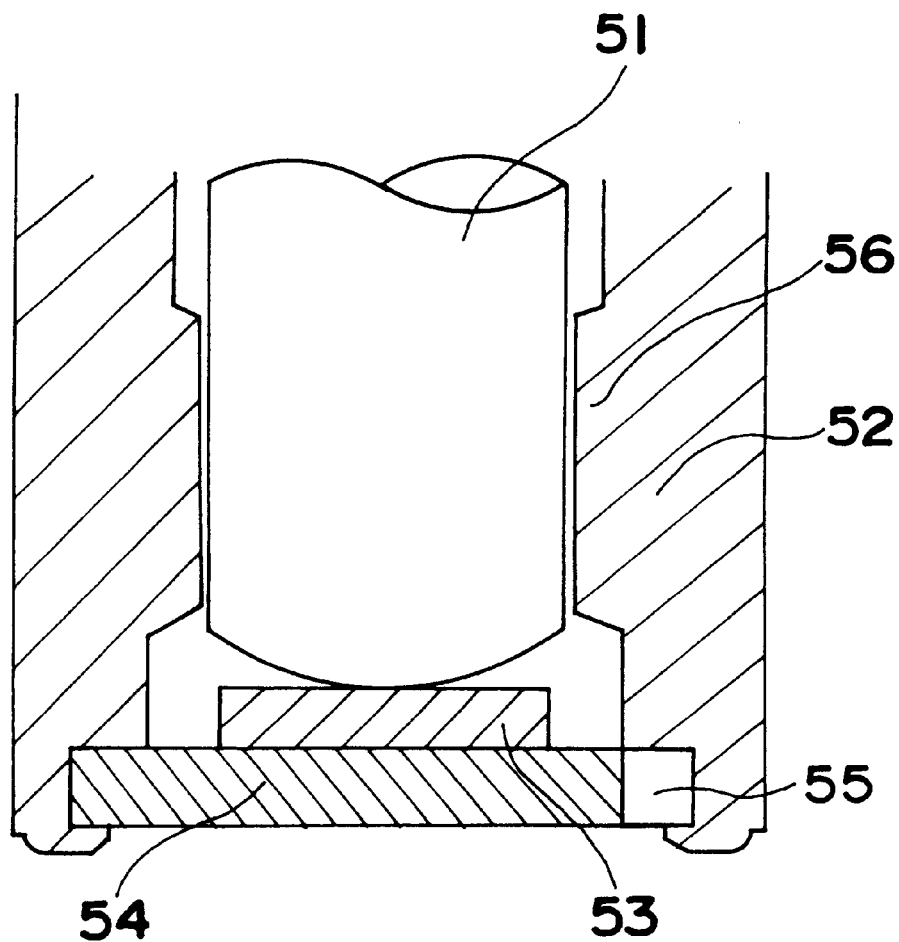
FIG. 5A is an enlarged sectional view of a pivot bearing part in a third embodiment of the present invention.
Figure 5B:
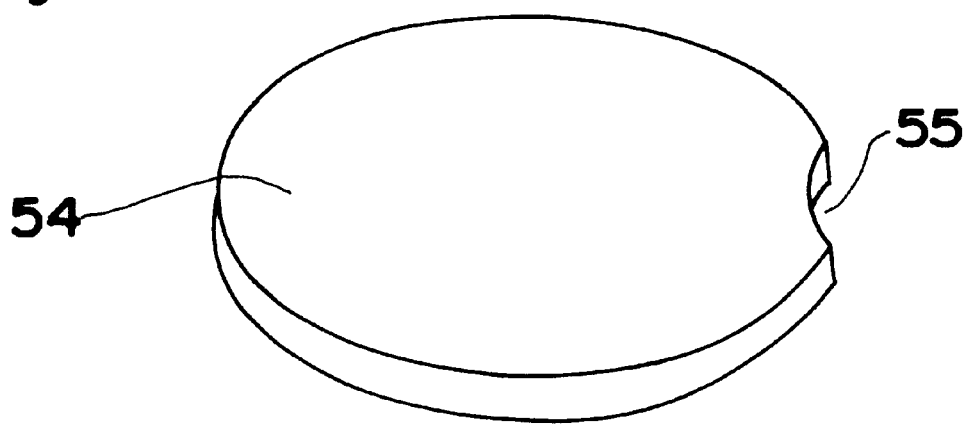
FIG. 5B is a perspective view of a bottom plate in the third embodiment of the present invention.

FIG. 5A is an enlarged sectional view of a thrust pivot bearing in the third embodiment of the present invention and FIG. 5B is a perspective view of a bottom plate having a notch part at an outer peripheral part thereof in the third embodiment of the present invention.

Referring to FIGS. 5A and 5B, reference numerals 51–56 are respectively a shaft, a sleeve part, a thrust member, a bottom plate, a notch part formed in an outer peripheral part of the bottom plate 54, and a cylindrical part of the sleeve part 52 having a herringbone groove.

The notch part 55 is formed at part of the bottom plate 54 which is securely caulked to the sleeve part 52. An air vent between the interior and exterior of the sleeve part 52 is obtained at the notch part 55. Even when the device is in a sealed structure by the sleeve part 52 and the bottom plate 54, if a surface of the notch part 55 at the bottom plate 54 in touch with the sleeve part 52 is made small, the microscopic gap at the surface acts as an orifice, thereby maintaining communication between the interior and exterior of the sleeve part 52.

When the sleeve part 52 and the bottom plate 54 are securely fixed to each other by caulking or the like, into a sealed state, the notch part 55 of the bottom plate 54 maintains communication with the outside. The air in the sleeve part 52 is discharged out through the communicating part of the notch part 55 when the oil is lubricated into the sleeve part 52 to insert the shaft 51 thereinto, because the oil obstructs sufficient communication of the cylindrical part 56 of the sleeve part 52 and the shaft 51 with the outside. The shaft 51 of the fluid bearing of a narrow gap can be accordingly easily inserted to a set position.

A fourth embodiment of the present invention will be depicted with reference to the drawings.

Figure 6:
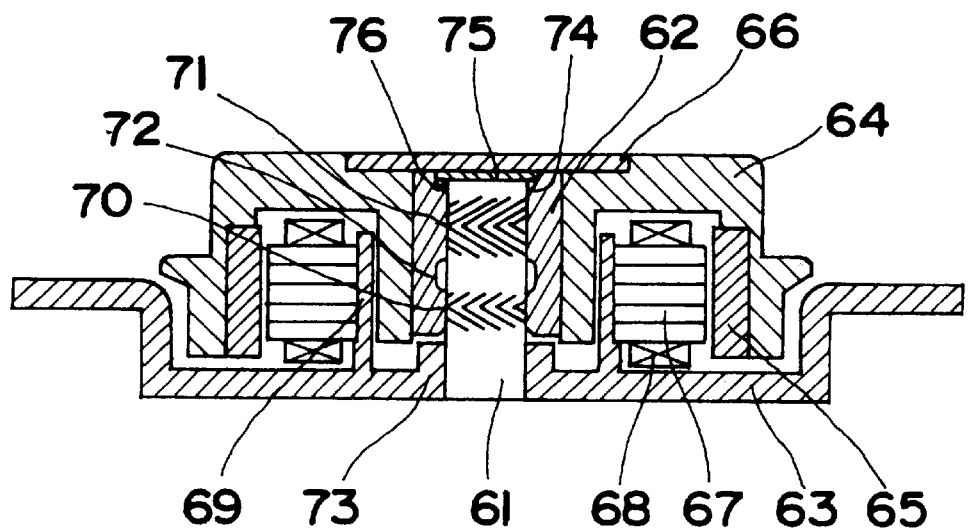
FIG. 6 is a sectional view of a magnetic disk driving apparatus using a dynamic pressure bearing in a fourth embodiment of the present invention.
Figure 7:
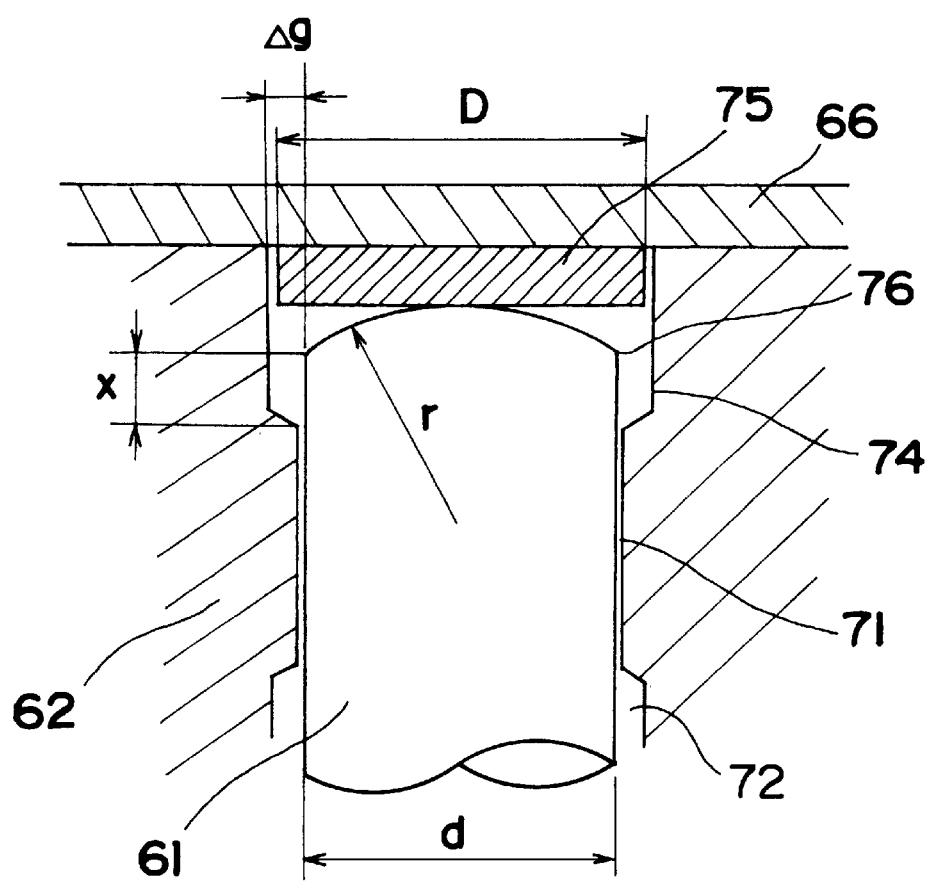
FIG. 7 is an enlarged view explanatory of a pivot bearing part in the fourth embodiment of the present invention.
Figure 8:
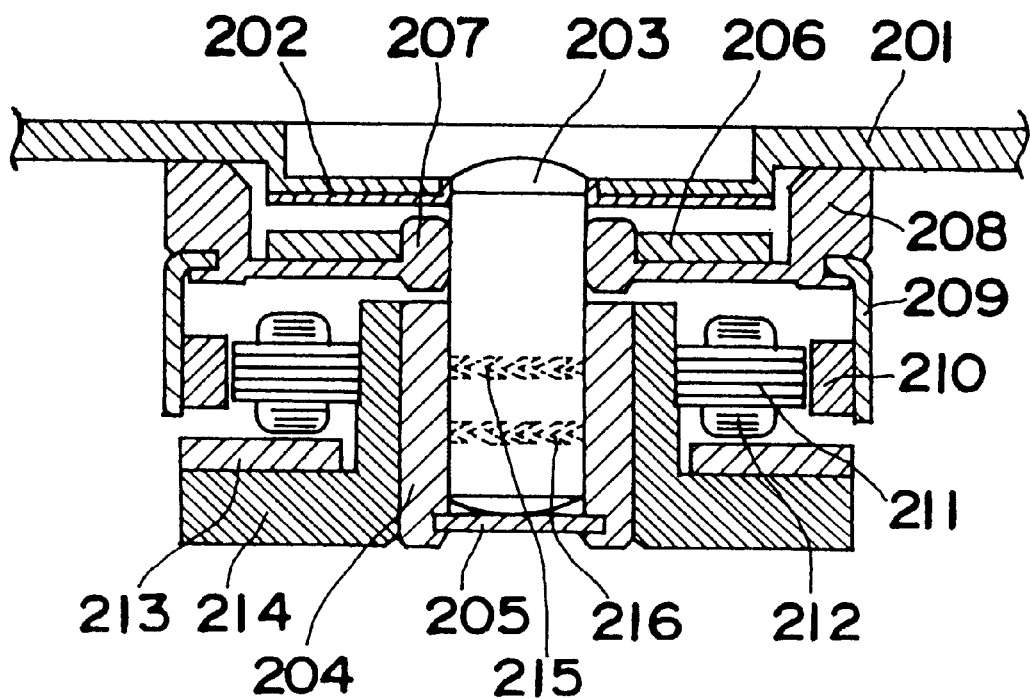
FIG. 8 is a sectional view of a conventional magneto-optic disk driving apparatus using a dynamic pressure bearing in a state meshed with a magneto-optic disk.

FIG. 6 is a sectional view of a magnetic disk driving apparatus using a dynamic pressure bearing according to the fourth embodiment of the present invention, and FIG. 7 is an enlarged view of a thrust pivot bearing in the fourth embodiment of the present invention.

In FIGS. 6 and 7, reference numeral 61 is a shaft, 62 a sleeve part, 63 a housing, 64 a rotor hub part, 65 a magnet, 66 an upper plate, 67 a stator core, 68 a coil, 69 an inner cylindrical part of the housing 63, 70 a first cylindrical part of the sleeve part 62, 71 a second cylindrical part of the sleeve part 62, 72 a space part, 73 a shaft clamping part of the housing 63, 74 a third cylindrical part of the sleeve part 62, 75 a thrust member, 76 an intersecting outline part of a front R-shape and an outer peripheral part of the shaft 61.

As indicated in FIG. 6, the stator core 67 with the coil 68 wound therearound is secured to the outer peripheral surface of the inner cylindrical part 69 of the housing 63. The shaft 61 is fixed to the clamping part 73 at an inner side from the inner cylindrical part 69 of the housing 63.

The rotor hub part 64 is rotatably supported by the above shaft 61. Concretely, the sleeve part 62 fixed to the rotor hub part 64 is supported via a dynamic pressure-type bearing mechanism, and a minute gap is present between the sleeve part 62 and the shaft 61 in which an oil is filled. The thrust member 75 of a high polymer is disposed between the upper plate 66 of the sleeve part 62 set on the rotor-side and an arc-sectional-shaped part at an end face of the shaft 61. The front end of the shaft 61 constitutes a pivot bearing sliding on the thrust member 75.

Herringbone grooves are formed at the outer surface of the shaft 61. The shaft 61 is inserted in a rotatable fashion into a hole of the sleeve part 62 having the first and second cylindrical parts 70, 71 at a confronting position to the grooves. The space part 72 of a larger diameter than the inner diameters of the first and second cylindrical parts 70 and 71 is formed between the first and second cylindrical parts 70 and 71, and moreover the third cylindrical part 74, larger than the first and second cylindrical parts 70, 71, is set at the thrust bearing-side of the sleeve part 62. The oil is filled in a minute gap between the first and second cylindrical parts 70, 71 and the shaft 61. The oil is also supplied to the thrust bearing-side.

The operation of the dynamic pressure-type bearing device of the above constitution will be described with reference to the drawings.

When the sleeve part 62 is rotated on the shaft 61, a dynamic pressure is generated via the oil because of the action of the herringbone grooves of the cylindrical parts 70, 71 of the sleeve part 62 at the side of the shaft 61. As a consequence, the sleeve part 62 floats relative to the shaft 61 and the rotor part is rotated in a non-contact manner. The device is closed in the thrust direction by the sleeve part 62 and the upper plate 66. The thrust member 75 of a high polymer between the upper plate 66 and the front end of the shaft 61 slides at the front end of the shaft 61. While the thrust member 75 is abraded over long-time driving, part of the abrasion particles sometimes reach the intersecting outline part 76 along the front R part of the shaft 61. Since the intersecting outline part 76 does not overlap with the second cylindrical part 71, but overlaps with the third cylindrical part 74, if the relationship of Expression (4) is satisfied when a distance to the second cylindrical part 71 of the radial bearing closest to the intersecting outline part 76 of the pivot shaft is x and a gap between the shaft 61 and an inner diametrical part of the third cylindrical part 74 is $\Delta g$, abrasion particles generated from the thrust bearing are prevented from entering the radial bearing of the narrow gap, and accordingly, the life of the motor is ensured. The intersecting outline part 76 of the pivot shaft is designed not to cover the radial bearing in the dynamic pressure-type bearing device having the pivot bearing (referring to FIG. 7).

If a radius r of the front end of the shaft 61 is reduced, friction torque is reduced, but surface pressure is increased. Therefore, an excessive increase of the surface pressure deteriorates the reliability of the device if the thrust member 75 is formed of a resin. Moreover, when the radius r is increased, the friction force is increased although the surface pressure is decreased, whereby the torque loss is changed to heat to raise the temperature, reducing the reliability. Therefore, the pivot bearing is so designed that the relationship of the radius r of the front end of the shaft 61 of the thrust bearing and the diameter d of the shaft 61 fulfills Expression (3).

Since a conductive high polymer is used for the thrust member 75, the front end of the shaft 61 is electrically connected to the thrust member 75, thus turning the magnetic disk and the chassis of the apparatus in a conductive state. During the rotation of the magnetic disk, static electricity is not charged to the magnetic disk due to the friction between the magnetic disk and air, because a potential difference is not generated between the magnetic disk and magnetic head.

The thrust member 75 is composed of a general high polymer. However, if the apparatus is portable, a polyacetal resin with superior lubrication properties is selected so as to reduce the long-term friction torque. Further, if the apparatus is often driven at a high temperature, a polyimide resin which is superior in resistances to heat is used.

When the relationship of an outer diameter D of the thrust member 75 and the diameter d of the shaft 61 is set to hold Expression D>d, the thrust member 75 is prevented from dropping out of the sleeve part 62 when the shaft 61 is inserted. The shaft 61 is accordingly inserted stably. Even when the shaft 61 is moved in the thrust direction, the thrust member 75 tightly adhered to the upper plate 66 is prevented from moving owing to the presence of the oil. Nevertheless, the thrust member 75 actually moves in a plane direction in some cases. In such case, the contact area is increased to thereby hinder the movement of the thrust member 75, and moreover the diameter of the third cylindrical part 74 regulates the movement of the thrust member 75. If the thrust member 75 is assembled with the sleeve part 62 before the upper plate 66 is fitted, a bearing achieving the relationship D>d is formed.

The dynamic pressure-type bearing device of the present invention accomplishes the following.

For the thrust direction, there is formed a pivot bearing with a resin thrust member interposed between the front end of the shaft and the metallic plate. Although abrasion is brought about through the sliding friction between the front end of the shaft and the thrust member, metallic abrasion particles are never generated that might enter and accelerate the abrasion in the pivot bearing. If the thrust member is formed of a material having superior lubricity and heat-proof properties, the reliability of the device is further improved.

If a conductive thrust member is employed, the front end of the shaft is in a conductive state with the chassis of the apparatus via the thrust member.

In the case where the sleeve part and the metallic plate are secured to each other by caulking or the like, when the oil is lubricated into the sleeve part fixed to the metallic plate so as to insert the shaft thereinto, the air inside the sleeve part escapes through the small hole or gap communicating with the outside of the sleeve part. Therefore, the shaft can be inserted to a set position easily.

With the embodiments discussed above, it should be noted that it is clear from the above description and accompanying drawings that a common lubricating fluid is present at the dynamic pressure radial bearing between the sleeve and the shaft, and at the thrust pivot bearing at the front end of the shaft and the thrust member. The dynamic pressure radial bearing, thus, is in fluid communication with the thrust pivot bearing. This fact is readily appreciated from the above. It is further noted that the sleeve and the plate or bottom plate substantially enclose the space around the thrust pivot bearing. This space is filled with the lubricating fluid. Thus, the sleeve in the bottom plate, together with the thrust pivot bearing, substantially enclose a small area around the thrust pivot bearing, as illustrated for example in FIGS. 2, 5A and 7.

Although the present invention has been fully described in connection with the preferred embodiments thereof and with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An oil lubrication dynamic pressure-type bearing device for a disk driving apparatus, comprising:

a housing main body;

a sleeve fixed with respect to said main body;

a rotor that is relatively rotatable with respect to said main body;

a shaft that is fixed with said rotor, said shaft having a spherical front end;

a bottom plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing between said sleeve and said shaft and at said thrust pivot bearing, said dynamic pressure radial bearing being in fluid communication with said thrust pivot bearing;

wherein said sleeve and said bottom plate substantially enclose a space around said thrust pivot bearing, said space being filled with said lubricating fluid;

wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto do not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft;

wherein $\Delta g > x$;

wherein said shaft has a diameter d; and wherein said thrust pivot bearing satisfies the relationship $10d > r > 1.5*(d/2)$.

2. An oil lubrication dynamic pressure-type bearing device for a disk driving apparatus, comprising:

a housing main body;

a sleeve fixed with respect to said main body;

a rotor that is relatively rotatable with respect to said main body;

a shaft that is fixed with said rotor, said shaft having a spherical front end;

a bottom plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing between said sleeve and said shaft and at said thrust pivot bearing, said dynamic pressure radial bearing being in fluid communication with said thrust pivot bearing;

wherein said sleeve and said bottom plate substantially enclose a space around said thrust pivot bearing, said space being filled with said lubricating fluid;

wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto do not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft; and wherein $\Delta g > x$.

3. The device of claim 2, wherein said thrust pivot bearing comprises said front end of said shaft and a thrust member that is at said bottom plate, said thrust member being interposed between said front end of said shaft and said bottom plate.

4. The device of claim 3, wherein said thrust member is formed of a high polymer.

5. The device of claim 4, wherein said high polymer of said thrust member contains a conductive material.

6. An oil lubrication dynamic pressure-type bearing device for a disk driving apparatus, comprising:

a housing main body;

a sleeve fixed with respect to said main body;

a rotor that is relatively rotatable with respect to said main body;

a shaft that is fixed with said rotor, said shaft having a spherical front end;

a bottom plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing, between said sleeve and said shaft and at said thrust pivot bearing said dynamic pressure radial bearing being in fluid communication with said thrust pivot bearing;

wherein said sleeve and said bottom plate substantially enclose a space around said thrust pivot bearing, said space being filled with said lubricating fluid;

wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto do not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft;

wherein $\Delta g > x$;

wherein said shaft has a diameter d adjacent to said front end;

wherein said thrust pivot bearing comprises a thrust member which has a diameter D; and wherein $D > d$.

7. An oil lubrication dynamic pressure-type bearing device for a disk driving apparatus, comprising:

a housing main body;

a rotor that is relatively rotatable with respect to said main body;

a sleeve fixed with respect to one of said main body and said rotor;

a shaft that is fixed with respect to the other of said main body and said rotor, said shaft having a spherical front end;

a plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing between said sleeve and said shaft and at said thrust pivot bearing, said dynamic pressure radial bearing being in fluid communication with said thrust pivot bearing;

wherein said sleeve and said plate substantially enclose a space around said thrust pivot bearing, said space being filled with said lubricating fluid; and wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto does not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft;

wherein $\Delta g > x$ wherein said shaft has a diameter d; and wherein said thrust pivot bearing satisfies the relationship $10d > r > 1.5*(d/2)$.

8. An oil lubrication dynamic pressure-type bearing device for a disk driving apparatus, comprising:

a housing main body;

a rotor that is relatively rotatable with respect to said main body;

a sleeve fixed with respect to one of said main body and said rotor;

a shaft that is fixed with respect to the other of said main body and said rotor, said shaft having a spherical front end;

a plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing between said sleeve and said shaft and at said thrust pivot bearing, said dynamic pressure radial bearing being in fluid communication with said thrust pivot bearing;

wherein said sleeve and said plate substantially enclose a space around said thrust pivot bearing, said space being filled with said lubricating fluid; and wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto does not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft; and wherein $\Delta g > x$.

9. The device of claim 8, wherein said thrust pivot bearing comprises said front end of said shaft and a thrust member that is at said plate, said thrust member being interposed between said front end of said shaft and said plate.

10. The device of claim 9, wherein said thrust member is formed of a high polymer.

11. The device of claim 10, wherein said high polymer of said thrust member contains a conductive material.

12. The device of claim 10, wherein said high polymer of said thrust member is a polyacetal resin.

13. The device of claim 10, wherein said high polymer of said thrust member is a polyimide resin.

14. An oil lubrication dynamic pressure-type bearing device for a disk driving apparatus, comprising:

a housing main body;

a rotor that is relatively rotatable with respect to said main body;

a sleeve fixed with respect to one of said main body and said rotor;

a shaft that is fixed with respect to the other of said main body and said rotor, said shaft having a spherical front end;

a plate secured with respect to said sleeve so as to face said front end of said shaft;

a dynamic pressure radial bearing between said sleeve and said shaft comprising herringbone grooves at either of said shaft and said sleeve;

a thrust pivot bearing providing axial support between said shaft and said sleeve;

a common lubricating fluid at said dynamic pressure radial bearing between said sleeve and said shaft and at said thrust pivot bearing, said dynamic pressure radial bearing being in fluid communication with said thrust pivot bearing;

wherein said sleeve and said plate substantially enclose a space around said thrust pivot bearing, said space being filled with said lubricating fluid; and wherein said front end of said shaft is an R-form;

wherein said shaft has an intersecting outline part of the R-form of said front end and a peripheral part adjacent thereto;

wherein said sleeve has an inner diameter adjacent to said front end of said shaft that is sufficiently large such that said intersecting outline part and said peripheral part adjacent thereto does not overlap any of said herringbone grooves;

wherein said R-form of said front end of said shaft has a radius of curvature r;

wherein said intersecting outline part is spaced a distance x from the closest of said herringbone grooves;

wherein said sleeve has a cylindrical part adjacent to said front end of said shaft and having said inner diameter that is spaced by a gap $\Delta g$ from said shaft;

wherein $\Delta g > x$;

wherein said shaft has a diameter d adjacent to said front end;

wherein said thrust pivot bearing comprises a thrust member which has a diameter D; and wherein $D > d$.

* * * * *

UNITED STATES PATENT AND TRADEMARK OFFICE
CERTIFICATE OF CORRECTION

PATENT NO. : 6,072,660
DATED : June 6, 2000
INVENTOR(S) : Hiroyoshi TESHIMA

It is certified that error appears in the above-identified patent and that said Letters Patent is hereby corrected as shown below:

On the title page, in section [56], add:

-- JP 1-065322   3-1989
       JP 1-158218   6-1989
       JP 2-286913  11-1990
       JP 4-321809  11-1992
       JP 5-068355   3-1993
       JP 5-227692   9-1993
       JP 6-038498   2-1994 --.

Signed and Sealed this

First Day of May, 2001

Attest:

NICHOLAS P. GODICI

*Attesting Officer*    *Acting Director of the United States Patent and Trademark Office*